United States Patent
Sakamoto et al.

(10) Patent No.: US 7,158,243 B2
(45) Date of Patent: Jan. 2, 2007

(54) PRINTING APPARATUS AND PRINTING SYSTEM, CONTROL METHOD, STORAGE MEDIUM AND PROGRAM

(75) Inventors: Kazuya Sakamoto, Kanagawa (JP); Takayuki Fujita, Tokyo (JP); Tsutomu Takahashi, Kanagawa (JP); Mikio Shiga, Kanagawa (JP); Hiroshi Maruoka, Kanagawa (JP); Tetsuya Kawanabe, Kanagawa (JP); Nobuo Onuma, Kanagawa (JP); Masao Maeda, Kanagawa (JP); Nobuhiro Saito, Kanagawa (JP); Shunichi Kunihiro, Kanagawa (JP); Takashi Imoto, Kanagawa (JP); Kazuhisa Ebuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 925 days.

(21) Appl. No.: 09/903,588

(22) Filed: Jul. 13, 2001

(65) Prior Publication Data

US 2002/0021453 A1    Feb. 21, 2002

(30) Foreign Application Priority Data

Jul. 21, 2000    (JP)    ............... 2000-221238
Oct. 31, 2000    (JP)    ............... 2000-333340
Feb. 13, 2001    (JP)    ............... 2001-036042

(51) Int. Cl.
    *G06F 15/00*    (2006.01)
    *G06K 1/00*    (2006.01)
(52) U.S. Cl. ............... 358/1.1; 358/358; 358/1.14; 358/1.15
(58) Field of Classification Search ............... 358/1.15, 358/1.14, 3.13, 1.16, 1.9, 449; 366/81; 400/61, 400/54; 709/229, 205; 399/81
    See application file for complete search history.

(56) References Cited

U.S. PATENT DOCUMENTS

| | | | |
|---|---|---|---|
| 5,885,010 A * | 3/1999 | Kim ............... 400/54 |
| 6,055,361 A | 4/2000 | Fujita et al. |
| 6,078,404 A | 6/2000 | Natsume et al. |
| 6,389,248 B1 * | 5/2002 | Konno et al. ............... 399/81 |
| 6,512,592 B1 * | 1/2003 | Simpson et al. ............... 358/1.15 |
| 6,549,936 B1 * | 4/2003 | Hirabayashi ............... 709/205 |
| 6,549,947 B1 * | 4/2003 | Suzuki ............... 709/229 |
| 6,639,687 B1 * | 10/2003 | Neilsen ............... 358/1.14 |
| 6,667,816 B1 * | 12/2003 | Van Buren et al. ............... 358/3.13 |
| 6,676,309 B1 * | 1/2004 | Shima ............... 400/61 |
| 6,785,013 B1 * | 8/2004 | Ota et al. ............... 358/1.15 |
| 6,885,478 B1 * | 4/2005 | Salgado et al. ............... 358/449 |

FOREIGN PATENT DOCUMENTS

| | | |
|---|---|---|
| JP | 8-11396 | 1/1996 |
| JP | 10-289076 | 10/1998 |

\* cited by examiner

*Primary Examiner*—Kimberly Williams
*Assistant Examiner*—Satwant Singh
(74) *Attorney, Agent, or Firm*—Fitzpatrick, Cella, Harper & Scinto

(57) ABSTRACT

A printing apparatus can quickly cancel a print job without any influence on the other subsequent print jobs when a print cancel instruction is issued. During printing, if a print cancel instruction is inputted from a printer operation unit, a printer function manager notifies a print command interpreter of the cancellation. The print command interpreter searches data processed at that time in a transmission/reception buffer for an end mark command indicating the end of the cancelled job. Then the print command interpreter deletes the data before the end mark command.

28 Claims, 14 Drawing Sheets

F I G. 8
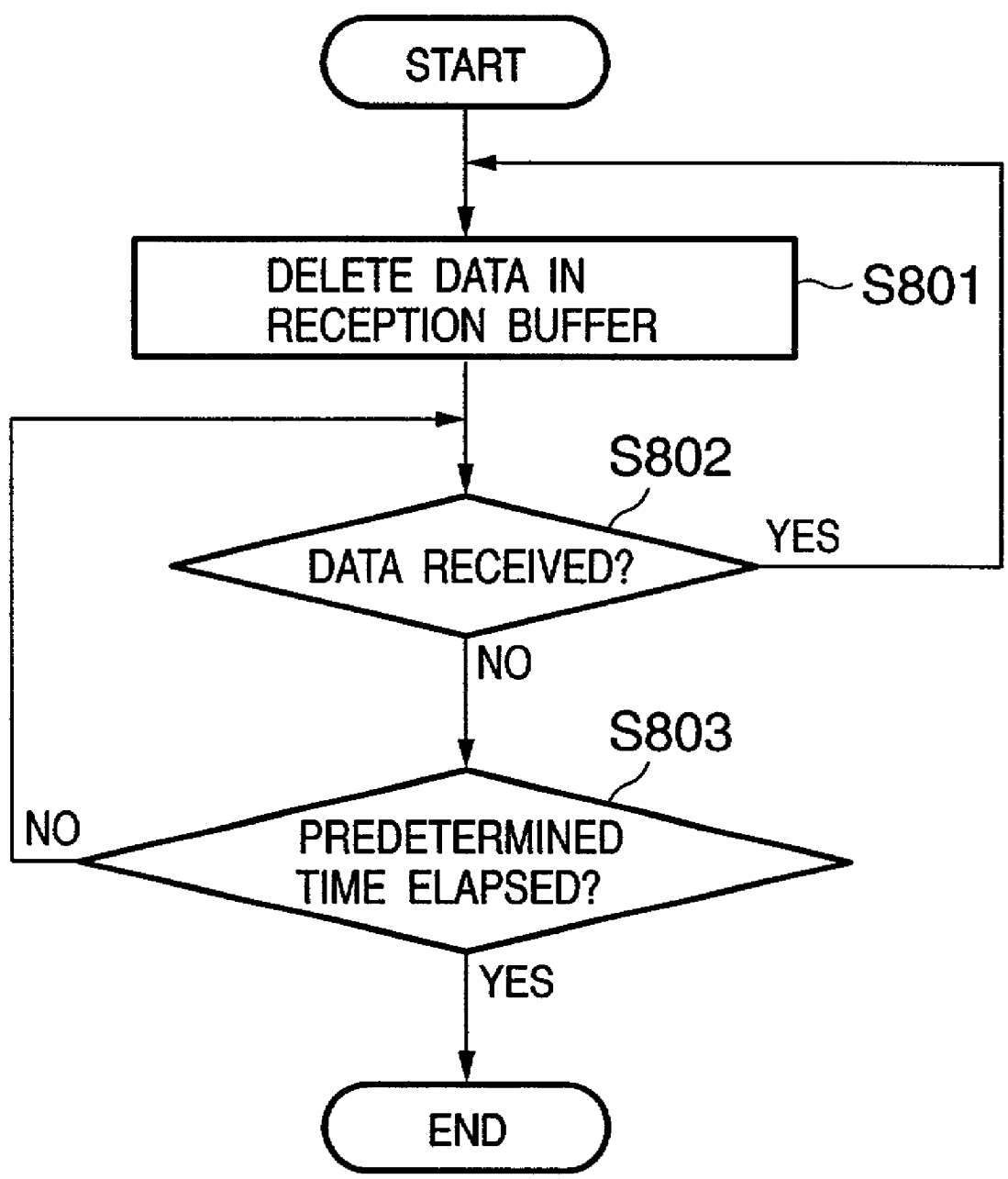

PRINTING APPARATUS AND PRINTING SYSTEM, CONTROL METHOD, STORAGE MEDIUM AND PROGRAM

FIELD OF THE INVENTION

The present invention relates to a printing apparatus and a printing system, a printing cancellation method, a storage medium and a program.

BACKGROUND OF THE INVENTION

Generally, as a transmission speed of interface between a host computer and a printer is higher than a printing speed of the printer, the printer has a large-capacity reception buffer. Received data is temporarily stored in the reception buffer. The printer performs printing while it sequentially reads the data stored in the buffer.

If an error occurs in data transmission from the host computer or a jam occurs in the printer, the host computer immediately stops the data transfer.

However, on the printer side, regarding data already stored in the reception buffer or an external buffer, as printing operation cannot be immediately stopped, unnecessary printing is continued.

Further, if printing must be performed for a long period as in the case of image drawing, even if an instruction is made to stop the printing operation, printing for the next file is not started until the unnecessary printing is completed. That is, waiting status is caused by the cancellation.

This problem is solved by forcibly deleting the content of the reception buffer by turning the power of the printer off or resetting the printer. However, in an environment where printing can be performed from plural host computers via a network or the like, when a user desires to delete his/her job, another user's print data may be stored in the reception buffer. In this case, the user may delete his/her job and further delete the other user's print job. The problem of printing cancellation becomes more serious as the buffer has a larger capacity.

Further, in recent printers, print data described in a page description language is interpreted. If the printer is reset when it has received data to the middle of one command, the sequence is shifted and even normal printing cannot be performed.

SUMMARY OF THE INVENTION

The present invention has been made in consideration of the above problems, and can provide a printing apparatus and an information processing apparatus, a printing system, a control method and a storage medium for quick cancellation of a print job without any influence on other subsequent print jobs upon issuance of a print cancel instruction.

The printing apparatus of the present invention has the following construction.

That is, provided is a printing apparatus comprising: instruction means for issuing a print cancel instruction; notification means for, in response to the print cancel instruction by the instruction means, notifying a higher-order apparatus of print cancellation, to cause the higher-order apparatus to stop generation of print data and to output predetermined data; and processing means for, after issuance of the print cancel instruction by the instruction means, deleting the print data until the predetermined data, outputted by the higher-order apparatus in response to a notification of print cancellation by the notification means, is inputted.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a flowchart showing a part of processing on the printer side according to a third embodiment of the present invention;

DETAILED DESCRIPTION OF THE PREFERRED EMBODIMENTS

Preferred embodiments of the present invention will now be described in detail in accordance with the accompanying drawings.

<First Embodiment>

Figure 1:
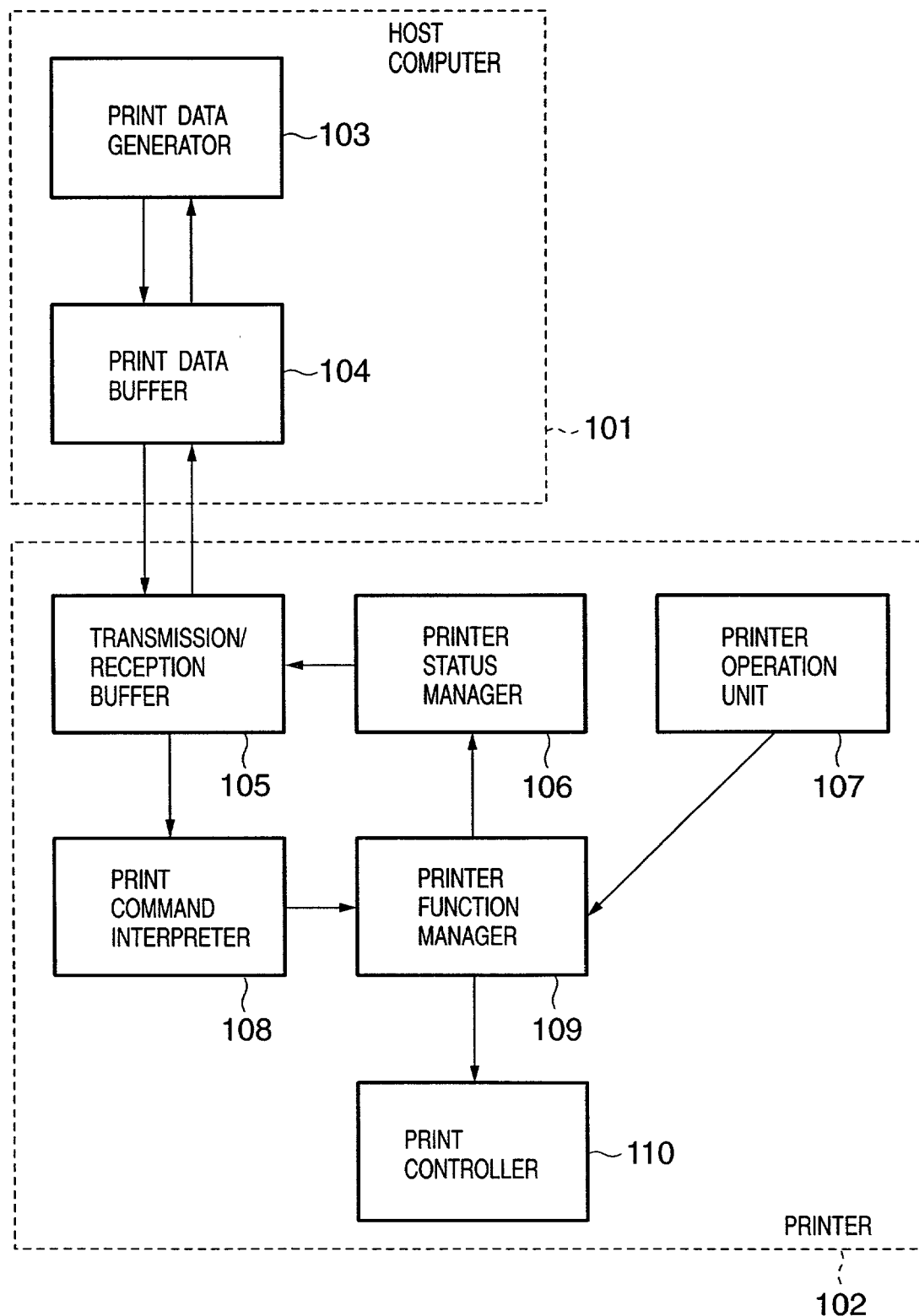
FIG. 1 is a block diagram showing the configuration of a printing system having a host computer and a printer.

FIG. 1 is a block diagram showing the construction of a printing system implementing the present invention having a host computer 101 and a printer 102.

In the present embodiment, the host computer 101 and the printer 102 are connected with each other via a bidirectional communication interface such as an IEEE1284 interface, a USB interface or an IEEE 1934 interface.

Print data is generated by the host computer 101, transmitted via the bidirectional interface to the printer 102, and print-outputted. When a document or the like generated by an application program which operates on the host computer is print-outputted, i.e., when an operation to perform printing is made by using a print menu of the application, data for printing is delivered from the application program to a print data generator 103 (generally corresponding to printer driver software), which generates print data appropriate to the printer 102. The print data is temporarily stored (spooled) in a print data buffer 104, and sequentially transmitted to the printer 102.

If a printer status manager 106 determines that reception is possible, the printer 102 receives the print data and stores the data into a transmission/reception buffer 105. A print command interpreter 108 sequentially reads the print data from the transmission/reception buffer 105, interprets the data, then stores a bitmap image data in a print buffer (not shown), and instructs a print controller 110 to perform printing.

When the printer 102 performs printing, if a user cancels the printing for some reason, the user selects "cancel printing" from a printer operation unit 107. A printer function manager 109 receives a notification of print cancellation from the printer operation unit 107, and to stop the currently-processed printing, instructs the print controller 110 to stop the printing. At this time, if paper feeding has been already started, image formation processing (exposure, development or the like in use of page printer such as a laser-beam printer, or printing processing by reciprocation of carriage in use of serial printer such as an ink-jet printer) is stopped, then the print sheet is discharged such that the processing from the cancellation to the paper discharge is made at a high speed. Further, the printer function manager 109 outputs a notification of print cancellation (including information to specify the print-cancelled job) to a printer status manager 106, and notifies the print command interpreter 108 of the cancellation of printing.

The printer status manager 106 which has received the notification of print cancellation writes the content of the notification into the transmission/reception buffer 105 and immediately notifies the host computer 101 of the cancellation. Further, the print command interpreter 108 which has been notified of the print cancellation searches data, received after the reception of currently-interpreted data, stored in the reception buffer, for an end mark (job end command) indicating the end of print job, then deletes the data before the mark, and updates the position of interpretation to an address position next to the end mark.

Accordingly, if the next job is stored in the transmission/reception buffer 105, the print job is immediately started.

Note that if print data is high-resolution photographic data or the like, as enormous amount of data is stored, all the data cannot be stored in the transmission/reception buffer 105. When such massive amount of data has been received and printing processing (image bitmapping in the print buffer or the like) is performed, if a user performs a print cancel operation, the print command interpreter 108 waits for storage of end mark into the transmission/reception buffer 105, i.e., the print command interpreter 108 waits until it receives an end mark.

However, if an enormous amount of print job is processed, as reception is continued until an end mark indicating the end of the print job is received, time is wasted.

In the present embodiment, if the print data generator 103 operating on the host computer 101 receives the above-described notification of print cancellation while generating print data from data for printing delivered from a higher-order application program, the print data generator 103 stops generation of print data if the cancelled print job included in the notification corresponds with the job of currently-processed print data. The print data generator 103 stores an end mark into the print data buffer 104, thereby reduces time for the printer 102 to find the end mark. This removes waiting for print data generation caused by print cancel processing.

Figure 4:
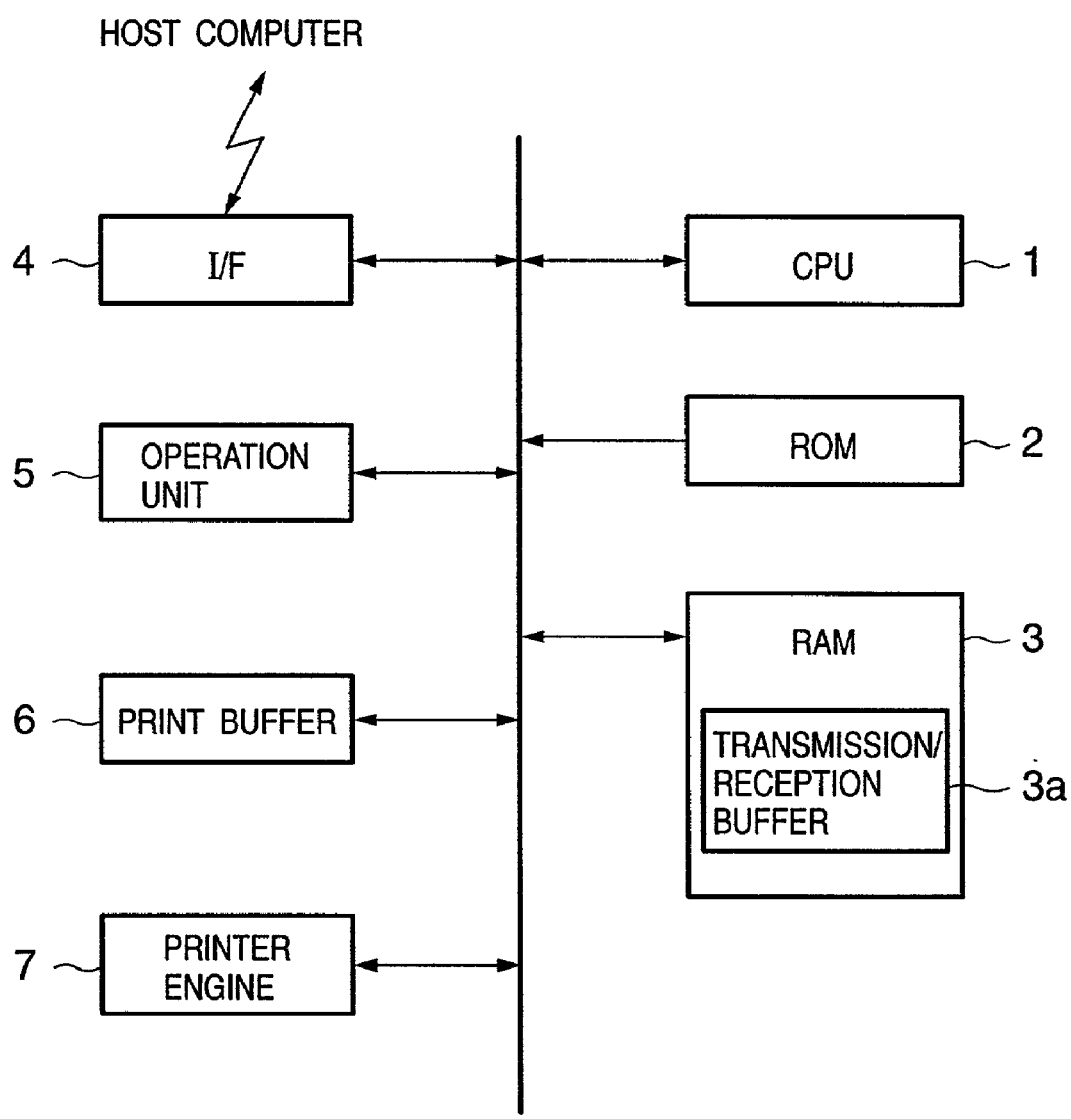
FIG. 4 is a block diagram showing the construction of a printing apparatus according to a first embodiment of the present invention.

FIG. 4 shows a particular block diagram of the printing apparatus according to the present embodiment to realize the above processing, and the operation of the apparatus will be described with reference to the flowchart of FIG. 2 (processing for one print job).

Figure 2:
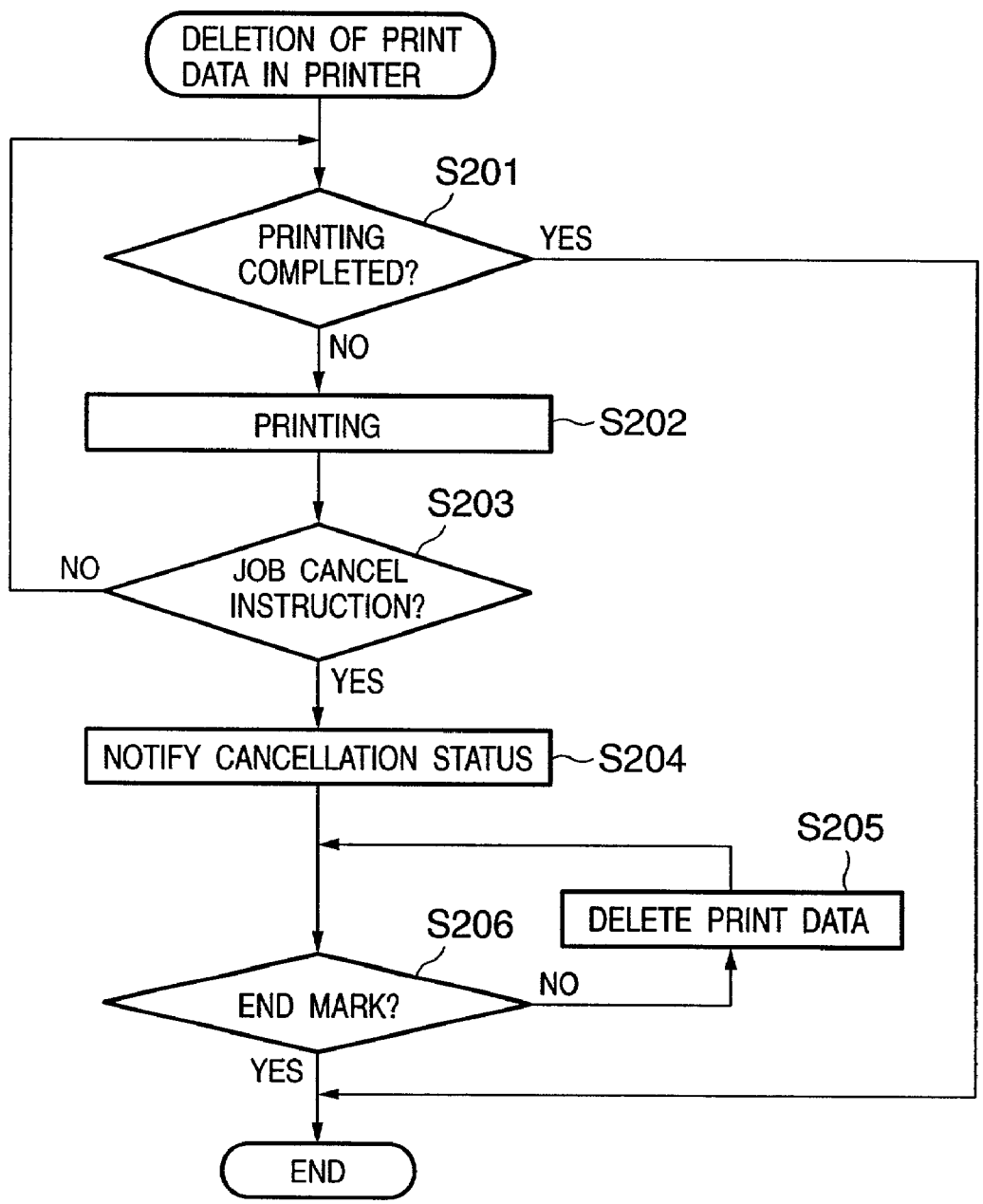
FIG. 2 is a flowchart showing the flow of print cancel processing on the printer side.

Note that in FIG. 4, reference numeral 1 denotes a CPU which controls the overall apparatus; 2, a ROM in which an operation processing procedure of the CPU (including a processing program according to the flowchart of FIG. 2); 3, a RAM used as a work area for the CPU-1, having a transmission/reception-buffer 3a (corresponding to the transmission/reception buffer 105 in FIG. 1); 4, an interface for bidirectional communication with the host computer, such as the IEEE 1284 interface, the USB interface or the IEEE 1394, as described above.

Numeral 5 denotes an operation unit corresponding to the printer operation unit 107 in FIG. 1; 6, a print buffer in which a bitmap image is stored; and 7, a printer engine which performs actual printing. In use of laser-beam printer, the printer engine 7 is constructed with a laser light emitting device, a polygon mirror and a motor for rotation of the mirror, an electrostatic drum, a fixer, a paper-feed motor, various sensors and the like. In use of ink-jet printer, the printer engine 7 is constructed with a carriage carrying a printhead, a motor for scanning the carriage, a paper-transfer motor and various sensors. Note that the printer status manager 106, the print command interpreter 108, the printer function manager 109 and the print controller 110 in FIG. 1 are realized by the CPU 1 and the programs stored in the ROM 2 in FIG. 4, however, they may be realized as independent circuits or processors.

In FIG. 2, first, at step S201, it is determined whether or not printing has been completed. If the printing has been completed (YES), the process ends, in preparation for the start of operation for the next job. If the printing has not been completed (NO), the process proceeds to step S202, at which print processing (reading data from the transmission/reception buffer, formation of bitmap image, and print-output processing when a predetermined amount of bitmap image has been stored) is executed. Next, at step S203, it is determined whether or not a notification of job cancellation has been received. If NO, steps S201 to S203 are repeated, and when the job has been normally completed, the process ends.

During the print processing, if it is determined that a print cancel instruction has been received from the operation unit, the process proceeds to step S204, at which a notification of job cancellation, to which information to specify the currently-processed job is added, is sent to the host computer.

At step S206, a pointer is advanced from the print data processed upon reception of the print cancel instruction to the subsequent data, and it is determined whether or not the subsequent data is an end mark. If the data is not an end mark, the process proceeds to step S205, at which the data is deleted, and this processing is repeated until an end mark is found.

When an end mark is detected, a print sheet in the printer is discharged for the next job, and the pointer is set to data subsequent to the end mark, and the process ends.

Note that in the processing at step S205, the print data is deleted, however, it may be arranged such that the received print data is skipped without interpretation until an end mark is detected.

Figure 3:
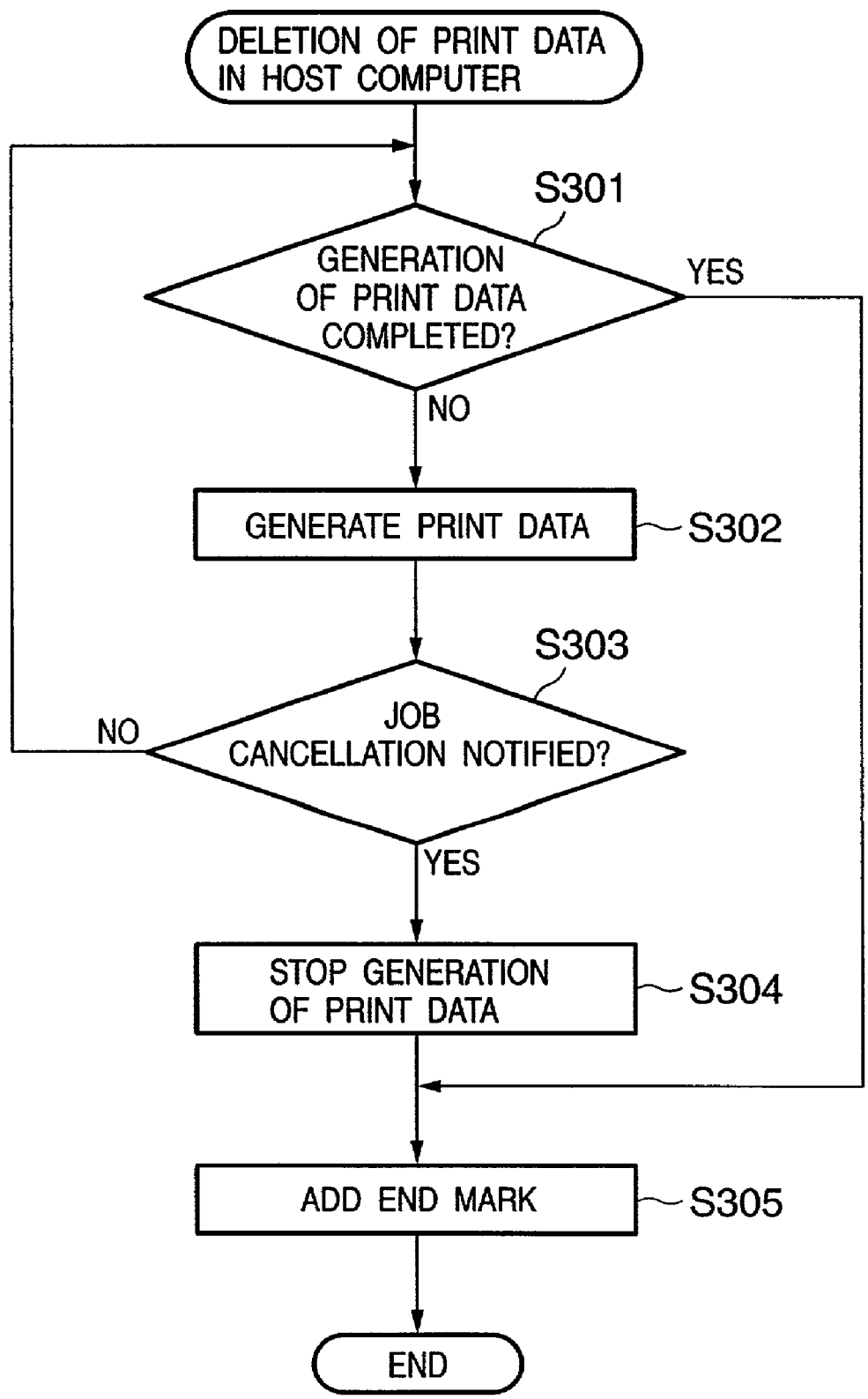
FIG. 3 is a flowchart showing the flow of print cancel processing on the host computer side.

On the other hand, on the host computer side, processing as shown in FIG. 3 is performed. Note that as the host computer 101 is a general personal computer as hardware, its particular block construction is not shown here, but the content of the processing procedure of a printer driver which functions as the print data generator 103 will be described.

First, at step S301, it is determined whether or not generation of print data, based on data delivered from a higher-order processing (application), has been completed. If it is determined that the generation of print data has been completed, the process proceeds to step S305, at which an end mark indicating the completion of the job is added to the data, and the process ends.

Further, if it is determined at step S301 that the generation of print data has not been completed, the process proceeds to step S302, at which print data is generated. At step S303, it is determined whether or not a notification of print job cancellation has been received from the printer, and if YES, it is determined whether or not the job of the notification of cancellation corresponds with the currently-processed job. If no notification of cancellation has been received or it is determined that the notification of cancellation has been made for another job which does not correspond with the currently-processed job (print job already output-processed in the past), the process returns to step S301, to repeat the above processing.

On the other hand, if it is determined at step S303 that the notification of cancellation has been made for the currently-processed job, the process proceeds to step S304, at which the print data generation processing is stopped, then an end mark is immediately added to the data at step S305, and the print data generation processing is terminated.

As a result, in accordance with the present embodiment, when the user performs an operation to cancel printing during printing by the printer, as data is deleted until an end mark indicating the job end of the current job is found in the reception buffer, the print job can be cancelled at a high speed, and print processing for the subsequent print job can be safely started at a high speed.

Further, when a print job of comparatively large data amount which may overflow from the reception buffer is executed, even if the job is cancelled, the host computer side stops print data generation processing for all the data for printing, and immediately sends an end mark. Accordingly, cancellation for a print job of a large data amount can be made at a high speed.

<Second Embodiment>

Figure 5:
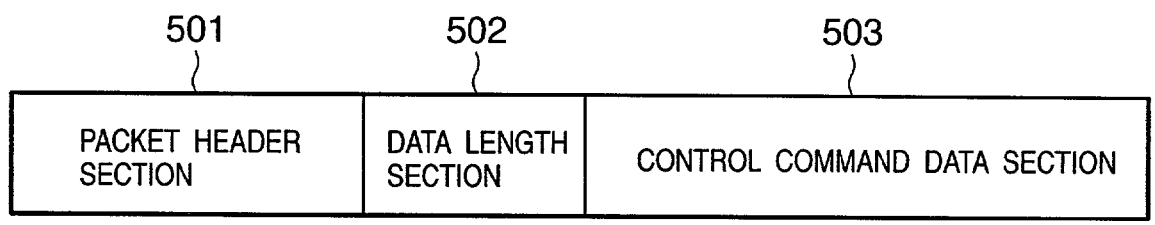
FIG. 5 is a schematic view showing a packet data format according to a second embodiment of the present invention.

In this embodiment, print data from the host computer is transferred in packet format. As shown in FIG. 5, the packet data is formed with a packet header section 501 (for example, particular 2 byte code), a data length section 502 (2 bytes) indicating the data length, and a control command data section 503 of bytes of the data length.

In the printer which performs printing by using the packet data, data is sometimes corrupted by the influence of noise in communication or the like. If a corrupted control command is included in the control command data section 502, the data is uninterpretable, and an error occurs otherwise processing cannot be continued. That is, even if the next print job is made, the execution becomes impossible. In this embodiment, if there is such uninterpretable control command, it is determined that an error has occurred in communication, and the packet is deleted such that printing processing can be continued at worst.

However, if there is a job end command (=job cancel command) in the ignored data section, as the job end command is ignored, the operation of the above-described first embodiment cannot be ensured.

In the second embodiment, even in the case of print data reception in such packet communication, the operator can cancel a job at arbitrary timing. Note that the printer has the same construction as that as shown in FIG. 4.

Figure 6:
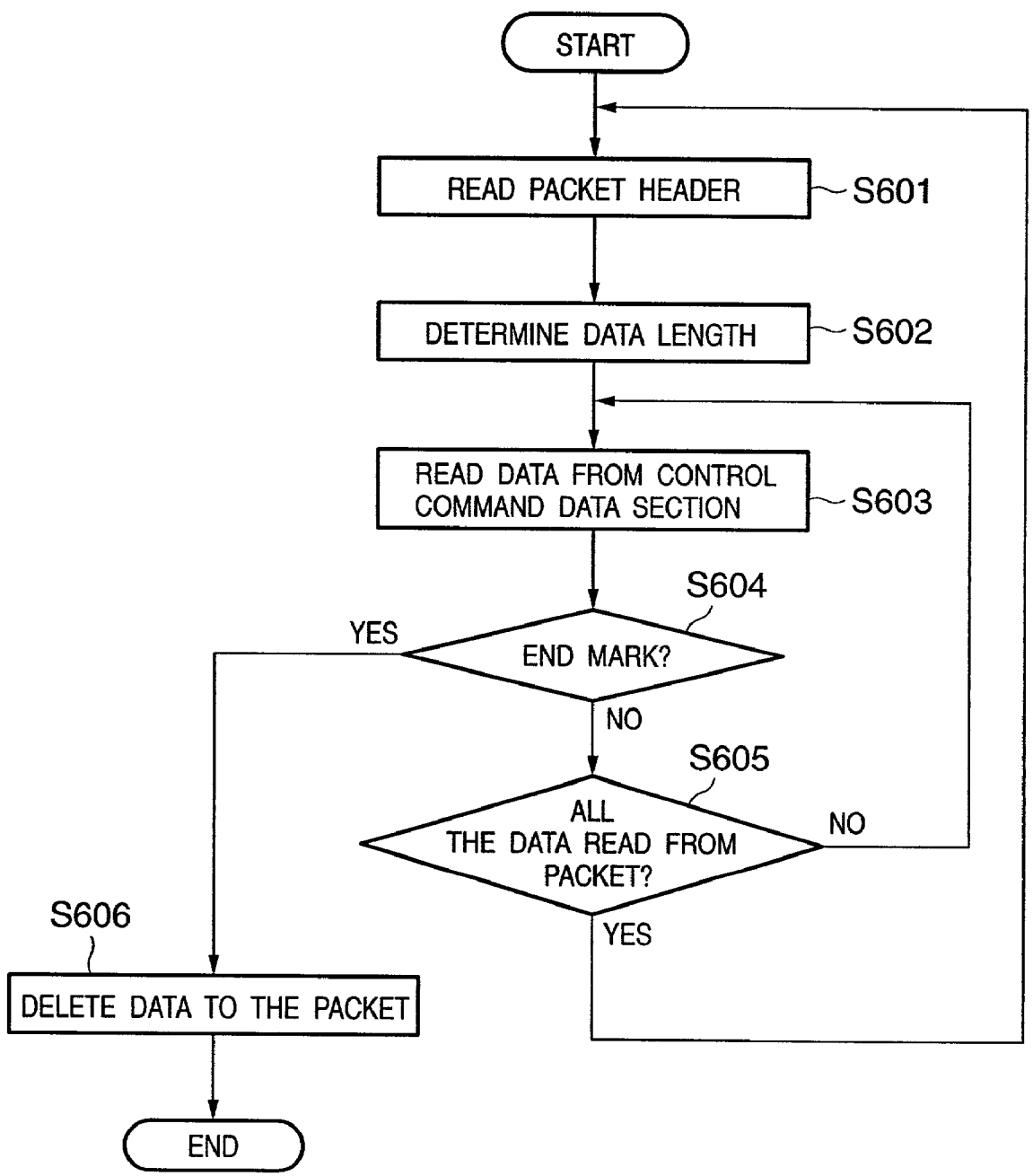
FIG. 6 is a flowchart showing a part of processing on the printer side according to the second embodiment.

The operation procedure on the printer side will be described with reference to the flowchart of FIG. 6. The processing corresponds to steps S205 and S206 in FIG. 2, and processing prior to this processing is the same as that in FIG. 2.

First, at step S601, a packet header is read from the reception buffer (when the reception buffer has no data, the process waits until the reception buffer receives data and reads the received data), and at step S602, data stored in the data length section 502 is obtained. At step S603, data is read from the control command data section 503, and at step S604, it is determined whether or not the read data is an end mark. If it is determined that the data is not an end mark, the process proceeds to step S605, at which it is determined whether or not all the data in the control command data section 503 has been determination-processed. If NO, the process returns to step S603 at which determination is made on the next data. If it is determined that all the data in the control command data section 503 of the packet has been processed (the determination can be made by the data length), the process returns to step S601 to perform processing on the next packet.

In this manner, the determination of existence/absence of end mark is repeated in the control command data section of each received packet, and when an end mark is finally detected, the process proceeds from step S604 to step S606, at which data from a position where interpretation was executed upon job cancellation to the packet including the end mark is deleted.

Figure 7:
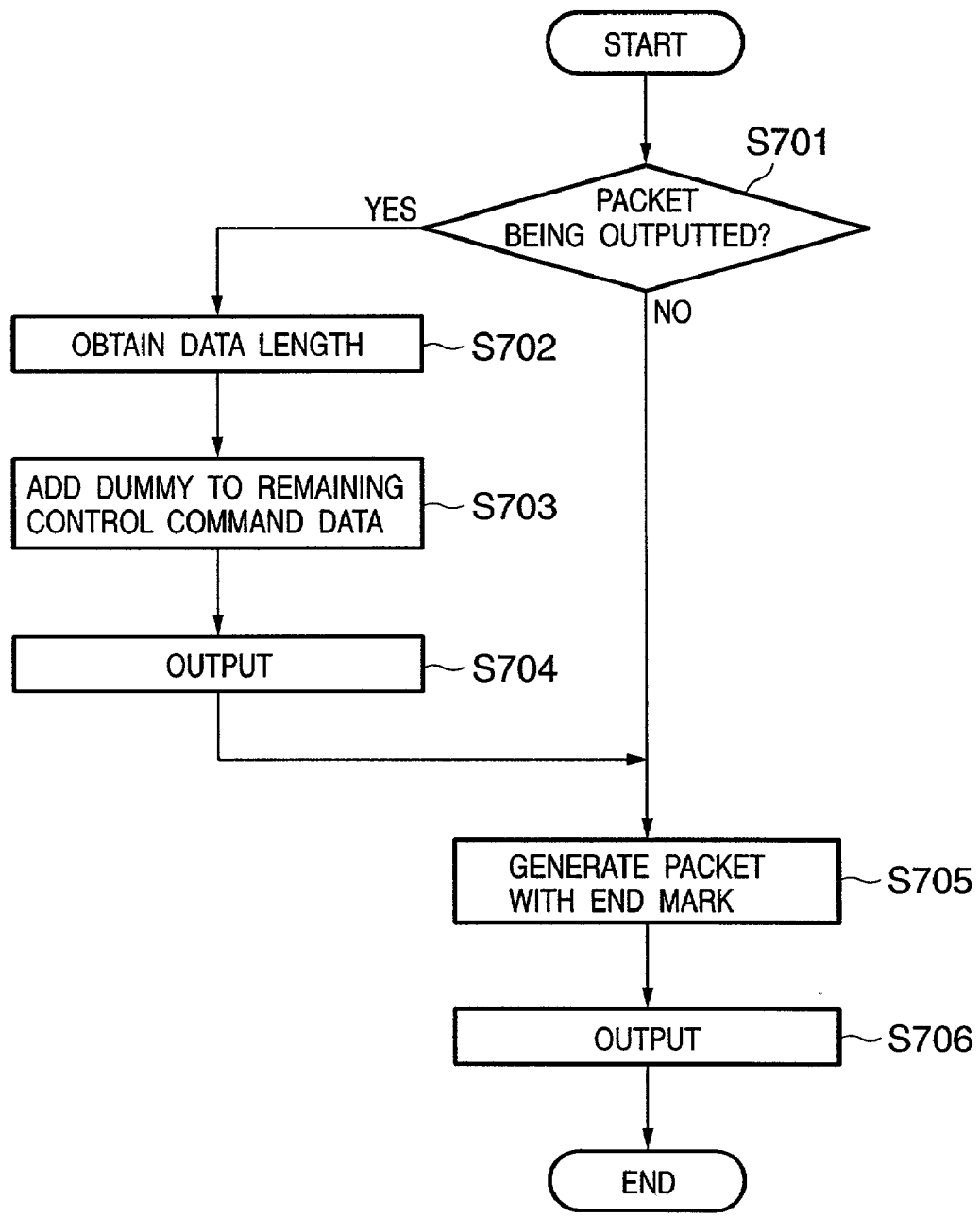
FIG. 7 is a flowchart showing a part of processing on the host computer side according to the second embodiment.

FIG. 7 shows a processing procedure of the host computer 101 according to the second embodiment. This processing is used for step S305 in FIG. 3.

At step S701, upon reception of job cancel notification from the printer, it is determined whether or not a packet is being outputted, i.e., whether or not the job cancel notification has been received when the packet has been outputted to the middle.

If it is determined that the packet has been outputted to the middle, the process proceeds to step S702 at which the data length at that time is obtained, and at step S703, dummy data for the amount of unoutputted data is added to the data, so as to prevent shift of sequence between the host computer side and the printer side. Then at step S704, the remaining data of the packet including the added dummy data is outputted.

When the output at step S704 is completed or if it is determined at step S701 that a packet is not being outputted (output of one packet has been completed), the process proceeds to step S705, at which a packet with an end mark is generated. In this packet, as the control command data section 503 includes only an end mark, the data length section 502 has only description of the number of bytes of the end mark. At step S706, the generated packet is outputted.

Figure 9:
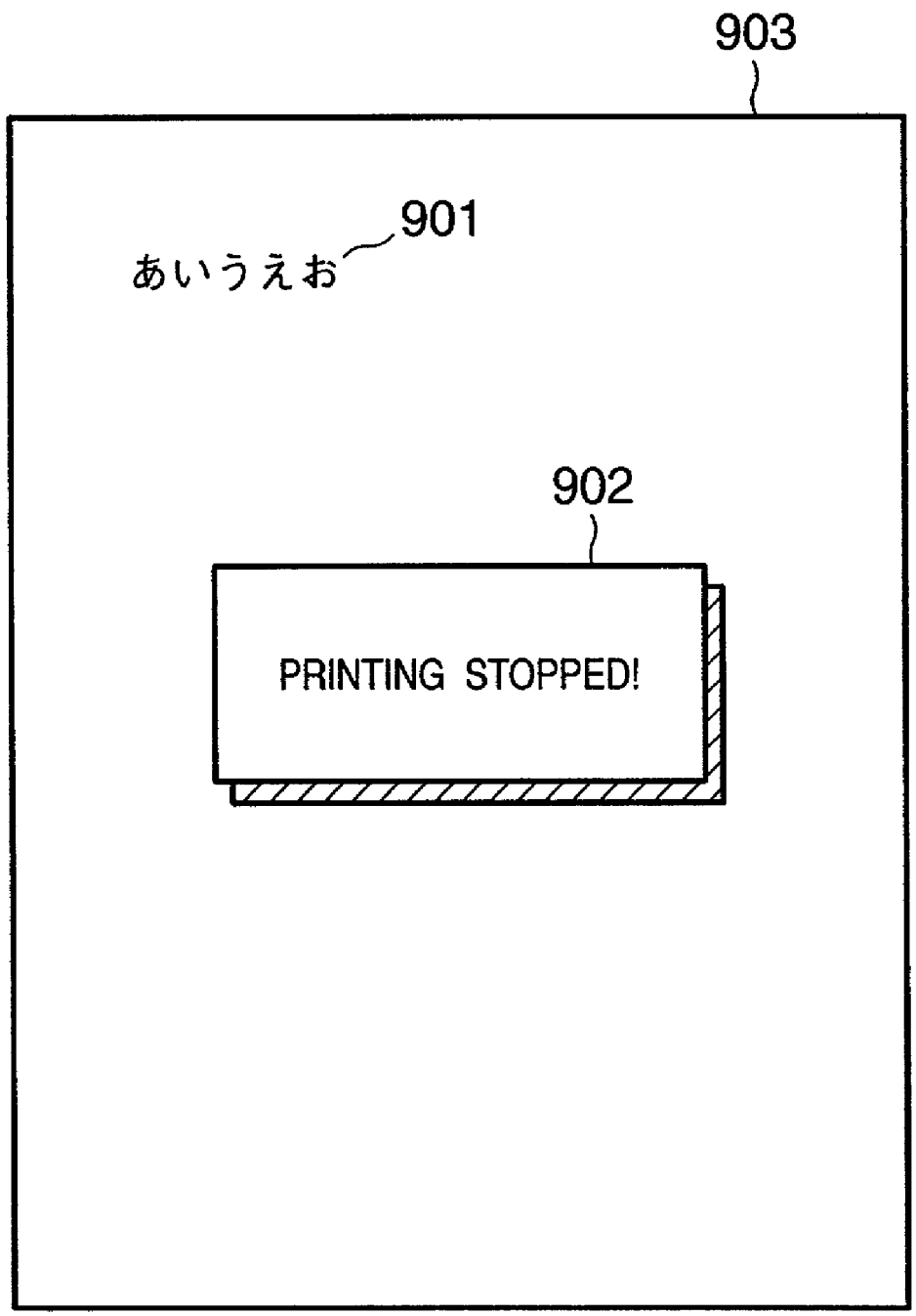
FIG. 9 is a sample of result of printing using dummy data according to the second embodiment.

FIG. 9 shows the result of printing using dummy data according to the second embodiment. Numeral 901 denotes the last data upon stoppage of printing. Numeral 902 denotes the result of printing based on the dummy data. In the present embodiment, the result of printing based on the dummy data is characters which visually notify the operator of the print cancellation. Numeral 903 denotes a print sheet.

To print an image indicative of print cancellation, it may be arranged such that the host computer adds a command to the data at step S706 and the printer print-outputs the data, otherwise it may be arranged such that after the detection of end mark at step S206 and before paper discharge, the printer adds the command to the data, and print-outputs the data. In the case where the command is added at step S206, the characters of the result of printing 902 or an image is directly written into the print buffer. In the case where the command is added by the host computer at step S706, the packet with the end mark is outputted and then a packet of drawing command of a bitmap image is generated to print the characters of the result of printing 902 or image indicating the print cancellation, and the packet is transmitted to the printer. On the printer side, the end mark is detected, then based on the received drawing command, the image of the result of printing 902 is printed, and the paper is discharged in preparation for the next job.

Further, in the present embodiment, it may be arranged such that the printer side prints an image like the result of printing 902 and discharges the paper after step S206, otherwise, it may be arranged such that the host computer generates a command to print-output the image of the result of printing 902 after step S305, and the printer performs printing based on the command after step S206 and discharges the paper.

<Third Embodiment>

Many of recent printers can handle plural printer languages in correspondence with OS's and applications operating on comparatively old host computers and in correspondence with various application areas of printer languages.

Many of existing printers interpret print data described in a page description language, however, some old printers do not use the page description language. These old printers are still used.

In old type printer languages, as a control command indicating the end of job does not exist, the language cannot be handled in the above-described first and second embodiments without difficulty.

In the third embodiment, such printer language without end mark indicating a job end is emulated. Note that since a technique to examine received print data to determine one of plural emulations to operate the printer, and to operate the printer by the determined emulation, is well-known, the explanation of the technique will be omitted.

When an a print cancel instruction has been received from the operation unit, the data is deleted from the point of reception of the instruction as in the case of the first and second embodiments. The difference is the position of end of the deletion.

In the third embodiment, data stored in the reception buffer is deleted from the point of reception of the print cancel instruction, and a point in time, where print data has not been received from the host computer even though a predetermined period has elapsed, is regarded as a job end. In other words, all the data received from the point of reception of instruction for print cancellation is deleted, and when a predetermined period has elapsed since the stoppage of data reception, printing is started based on data received after such interval.

Note that it is preferable that the predetermined period is several seconds to several tens seconds, and the period is arbitrarily set from the operation unit in accordance with an environment of the printer.

To realize the above feature, the printer may operate in accordance with the processing procedure in FIG. 8. Note that the flowchart of FIG. 8 is used immediately after step S203 in FIG. 2.

First, at step S801, unprocessed data in the reception buffer is deleted, and at step S802, it is determined whether or not data has been received. If data has been received, as the data is stored in the reception buffer, the process returns to step S801, to continue to delete the received data.

Further, when no data has been received, the process proceeds to step S803, at which it is determined whether or not a predetermined period has elapsed. If NO, the process returns to step S802, to wait until the predetermined period has elapsed. If no print data has been received after the elapse of the predetermined period, the deletion processing ends, and the process returns to main print processing. That is, regarding the print data received after the elapse of the predetermined period, the printer enters printing-standby status for print processing on the data.

<Fourth Embodiment>

Figure 10:
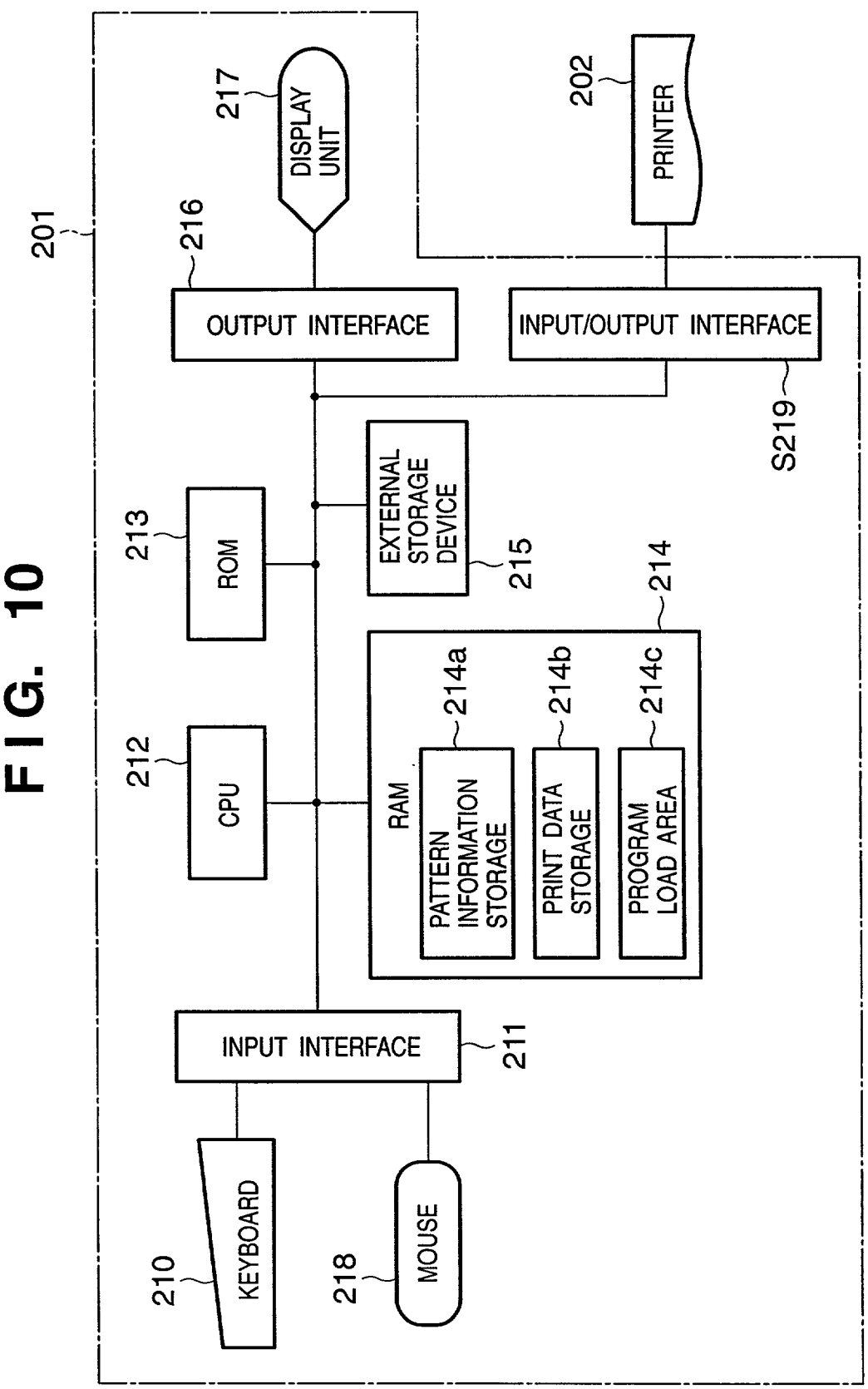
FIG. 10 is a block diagram showing the configuration of the system according to a fourth embodiment of the present invention.

FIG. 10 shows the configuration of the system according to a fourth embodiment in which a computer (general information processing apparatus) 201 and a printer 202 are connected to each other. As an external interface, a Centronics interface is used, however, another interface such as a USB interface or a SCSI interface may be employed.

The computer 201 has an input interface 211, a CPU 212, a ROM 213, a RAM 214, an external storage device 215, an output interface 216, a display unit 217, a mouse 218 and an input/output interface 219.

Figure 11:
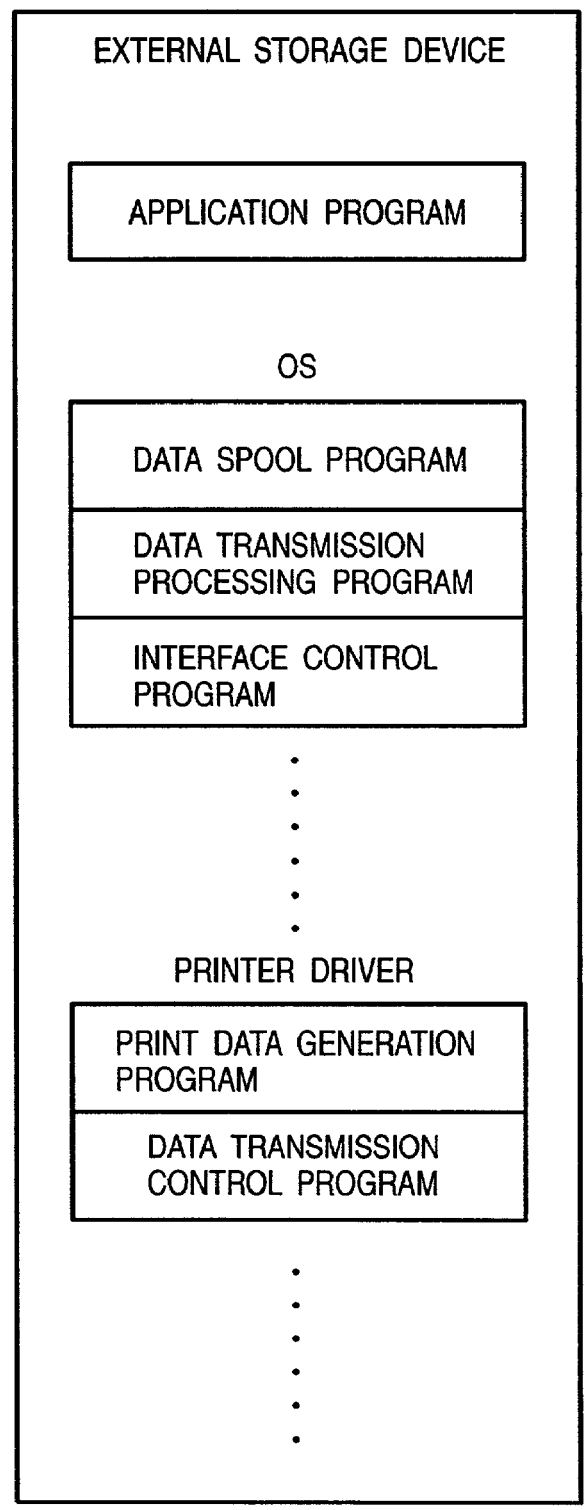
FIG. 11 is an example of programs stored in an external storage device 215 in FIG. 10.

An initial setting program (including BIOS and the like) is stored in the ROM 213. Further, as shown in FIG. 11, an application program, an OS (including a data spool program, a data transmission processing program, an interface control program and the like), and a printer driver (a print data generation program, a data transmission control program and the like) are stored in the external storage device 215.

The application program is used for providing an image generation environment and a printing environment and instructing to start printing. The data spool program is used for receiving generated print data and temporarily storing the data in the external storage device. The data transmission processing program is used for dividing the stored print data into print data blocks of a arbitrary size and repeatedly requiring data transmission from the printer driver. The interface control program is used for actually writing/reading data through the Centronics parallel interface, and issuing a busy signal when the reception buffer of the printer 202 is full and data reception is impossible. The print data generation program is used for converting pattern information generated in accordance with the application program into a printer command. The data transmission control program is used for receiving a data transmission request from the data transmission processing program, and parsing input print data block to detect a printer command break. Note that the position of the detected command break is necessary when printing is cancelled since the command break position is used for transmitting the data before the command break.

The RAM 214 has a pattern information storage 214a, a print data storage 214b and a program load area 214c. The respective storage areas are controlled in accordance with the control program stored in the external storage device 215.

Figure 12:
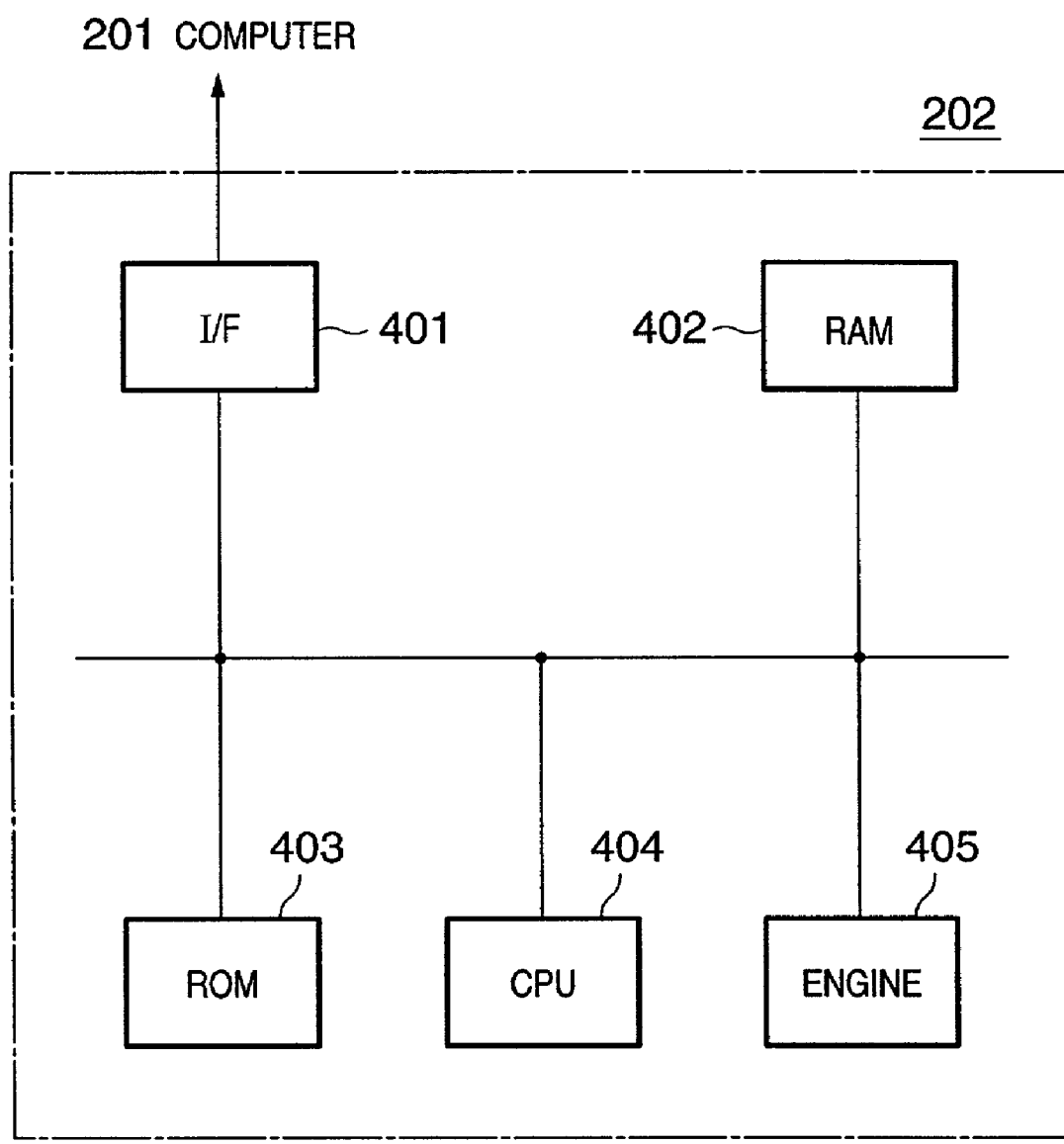
FIG. 12 is a block diagram showing the construction of a printer 202 in FIG. 10.

FIG. 12 is a block diagram showing the construction of the printer 202 in FIG. 10.

The printer 202 has an interface 401, a RAM 402, a ROM 403, a CPU 404 and an engine 405. The interface 401 is connected to the input/output interface 219 of the computer 201. A control program and the like are stored in the ROM 403. The CPU 404 controls the respective elements of the printer 303 in accordance with the control program stored in the ROM 403. The RAM 402 is used as a main memory and a work memory for the CPU 404. The RAM 402 has a reception buffer for temporarily storing received data. The engine 405 performs printing based on data stored in the RAM 402. Note that the engine 405 may be any type of engine as long as it forms a visible image on a recording medium such as paper. For example, an electrophotographic type (laser-beam printer or the like) engine, an ink-jet printhead type (a printer which discharges ink droplets by thermal energy) engine and the like are available.

Figure 13:
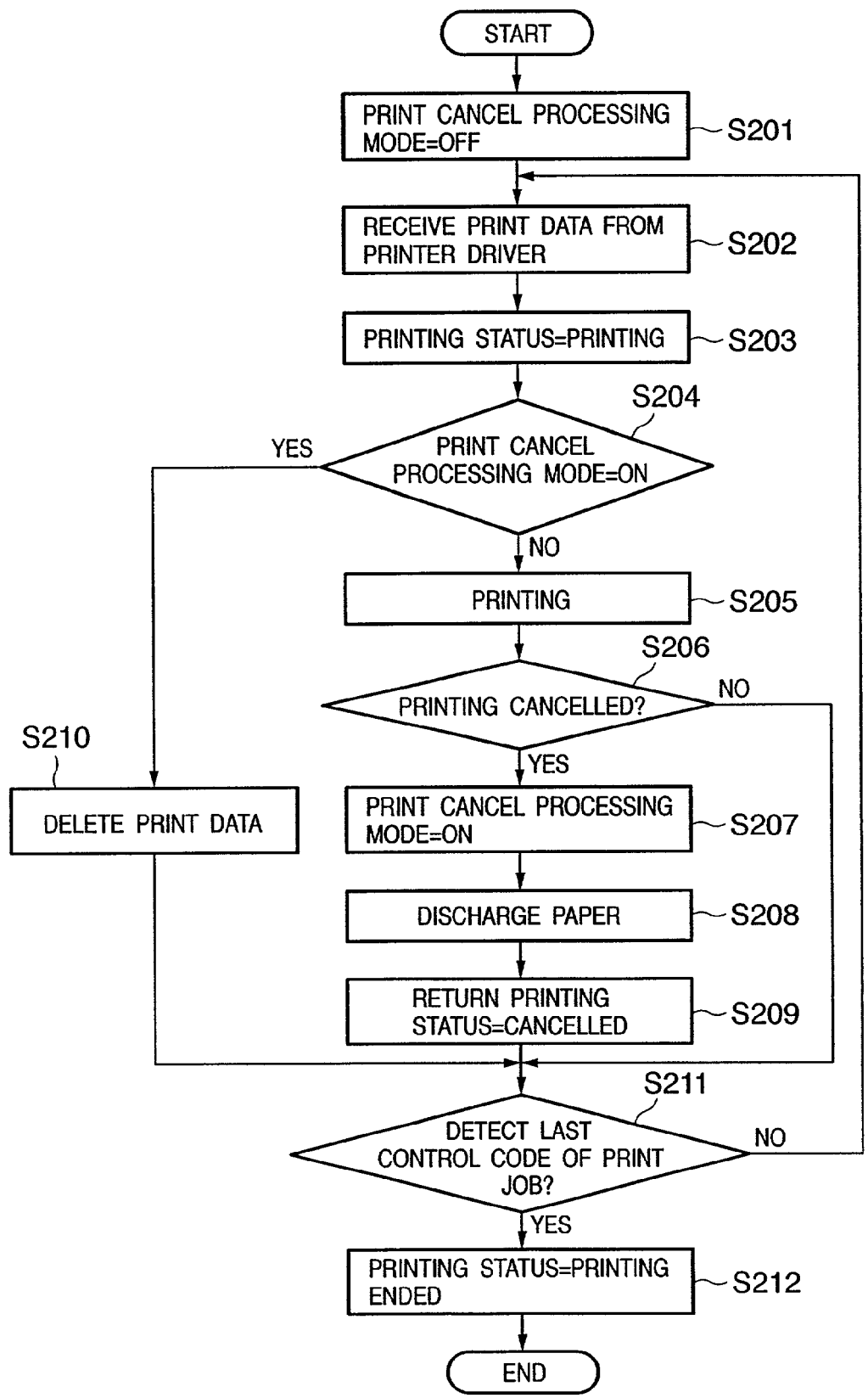
FIG. 13 is a flowchart showing the flow of processing by the printer 202 in FIG. 10.

FIG. 13 is a flowchart showing print cancel processing by the printer 202 in FIG. 10.

When the power of the printer 202 is turned on or the printer is reset, first, at step S201, information managed in the printer "print cancel processing mode" is set to "OFF" as an initial value.

Next, the process proceeds to step S202, to wait for print data from the printer driver that operates on the computer. When print data comes, the data is received. Then at step S203, information managed in the printer "printing status" is set to "printing".

Next, at step S204, it is determined whether or not the "print cancel processing mode" is "ON", i.e., whether or not a print cancel instruction has been issued from the operation panel (not shown) of the printer. If a print cancel instruction has been issued, the process proceeds to step S210, at which the print data received at step S202 is deleted instead of being print-outputted on a print sheet.

Further, if a print cancel instruction has not been issued, the process proceeds to step S205, at which printing on the print sheet is performed. Next, at step S206, it is determined whether or not a print cancel instruction has been issued from the operation panel. If a print cancel instruction has not been issued, the process proceeds to step S211, while if a print cancel instruction has been issued, proceeds to step S207.

At step S207, as the print cancel instruction has been issued, the "print cancel processing mode" set to the initial value at step S201 is set to "ON". Next, at step S208, as the printing has been cancelled, the currently-processed printing is stopped, and the print sheet is discharged from the printer. At step S209, the "printing status" set at step S203 is set to "cancelled", and this status is returned to the printer driver that operates on the computer so as to notify the computer that printing has been cancelled by the instruction from the operation panel and the printer has moved to the print cancel processing mode.

At step S211, it is determined whether or not a control code indicating the end of print job is included in the print data received at step S202. If a control code indicating the end of the print job is not found, the process returns to step S202, at which the next print data is received, and the series of processing is repeated. When a control code indicating the end of print job is detected, the process proceeds to step S212, at which the "printing status" set at step S203 or step S209 is set to "printing ended", and the printing is ended.

Figure 14:
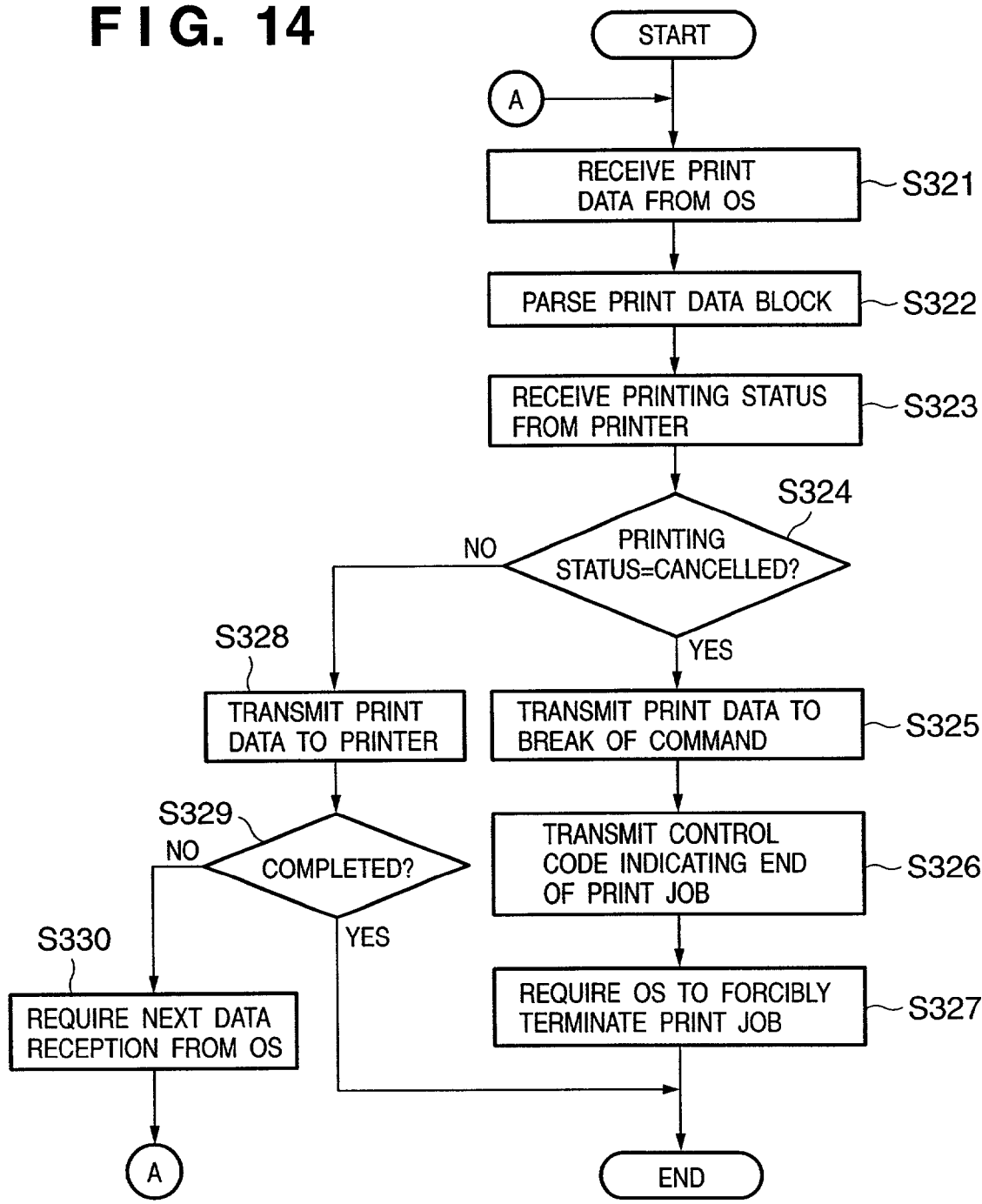
FIG. 14 is a flowchart showing a data transmission control program in a printer driver in a host computer 201.

FIG. 14 is a flowchart showing a data transmission control program in the printer driver stored in the RAM 214 the host computer 201. Hereinbelow, the operation according to the program will be described with reference to FIG. 14.

At step S321, the data transmission processing program of the OS divides print data temporarily-stored by the data spool program of the OS into data blocks of a predetermined size, and forwards the data to the data transmission control program of the printer driver. The data transmission control program receives this print data and gets ready for the subsequent processing.

At step S322, the print data received at step S321 is parsed, and the number of bytes of the print data from the head to the position of command break is detected. This is necessary for step S325 to transmit data by the command break upon cancellation of printing.

At step S323, the current printing status of the printer is obtained through the Centronics parallel interface and the interface control program of the OS.

At step S324, it is determined whether or not the printing status obtained at step S323 is "cancelled". If the status is "cancelled", the process proceeds to step S325 to perform processing not to send print data, while if the status is not "cancelled", proceeds to step S328 to transmit the subsequent print data to the printer.

At step S328, since the printing status is not "cancelled", the print data received at step S321 is transmitted to the printer. Then, it is determined whether or not all the data from the OS has been processed. If it is determined that the data output processing has been completed, the process ends. On the other hand, if it is determined that print data still exists, the process proceeds to step S330, at which the next print data is required from the data transmission processing program of the OS, and the processing at step S321 and the subsequent steps is repeated.

During the above processing, when the printing status becomes "cancelled", the process proceeds from step S324 to step S325. At step S325, in the print data received at step S321, data before the command break is transmitted. This processing is made for length adjustment to cause the printer to recognize a control code indicating the end of print job, transmitted at the next step S326. More particularly, data of the number of bytes before the command break detected at step S322 is transmitted from the head of the print data. If the transmission is omitted and only the control code indicating the end of print job is transmitted at step S326, the printer regards the code as a part of being-received command and it does not move from the print cancel processing mode.

At step S326, the control code indicating the end of print job is transmitted to the printer. The printer receives the control code and ends the print cancel processing mode. At step S327, the subsequent print data is not forwarded to the data transmission control program of the printer driver, but the data transmission processing program of the OS is required to quickly end the print job. In response to the requirement, the data transmission processing program deletes all the temporarily stored print data and ends the print job.

As described above, according to the fourth embodiment, a print cancel instruction issued from the operation panel of the printer is immediately transmitted to the printer driver operating on the computer, and a control code indicating the end of print job is transmitted without sending the subsequent unprinted data, thereby print cancellation can be realized without waiting time.

Note that in the above-described fourth embodiment, the printer 202 transmits the status of the printer to the host computer 201, however, in the case where the computer and the printer are connected with each other via a bidirectional communication interface, the printer status may be notified by a command.

Further, in the above-described first to fourth embodiments, even in the case where the host computer and the printer are connected with each other via a bidirectional communication interface, the computer and the printer are one-to-one connected. To use the printer as a network printer, a network interface card may be incorporated in the printer. In this case, the printer performs printing based on print data from a number of host computers. When an instruction to cancel printing is made, the host computer which transmitted the currently-processed job (the job-originated computer is found by examining IP of the received packet) is notified of the print cancellation.

As described above, according to the present invention, when a print cancel instruction is made, the print job can be quickly cancelled without any influence on the subsequent other print jobs.

The present invention is not limited to the above embodiments and various changes and modifications can be made within the spirit and scope of the present invention. Therefore, to apprise the public of the scope of the present invention, the following claims are made.

What is claimed is:

1. A printing apparatus which receives print job data from a host computer and prints, on a recording medium, an image on the basis of the received print job data, the host computer, upon receipt of a notification of print cancellation from said printing apparatus during generating and outputting of the print job data to said printing apparatus, stopping generation of the print data and outputting predetermined data indicating end of the print job to said printing apparatus, said printing apparatus comprising:
   instruction means for issuing a print cancel instruction;
   notification means for, in response to the print cancel instruction by said instruction means, stopping a current printing process and notifying the host computer of print cancellation, to cause the host computer to stop generation of print data and to output the predetermined data indicating end of the print job; and
   processing means for, after issuance of the print cancel instruction by said instruction means, deleting the print data received until the predetermined data will be received from the host computer.

2. The printing apparatus according to claim 1, wherein communication with the host computer is made by packet communication, and wherein said notification means notifies the host computer of the print cancellation, to cause the host computer to output dummy data for adjustment of packet data length and to output a packet including the predetermined data, in response to the print cancel instruction by said instruction means.

3. The printing apparatus according to claim 1, further comprising means for printing information regarding the print cancellation on a recording medium on which an image is printed based on the print data.

4. The printing apparatus according to claim 1, wherein after the issuance of the print cancel instruction by said instruction means, said processing means causes paper discharge.

5. The printing apparatus according to claim 1, wherein the host computer transmits the print data before a break of command and then outputs the predetermined data to said printing apparatus, in response to the issuance of the print cancel instruction by said instruction means.

6. The printing apparatus according to claim 1, wherein said processing means skips the print data received until the predetermined data is received from the host computer.

7. A printing system comprising a host computer and a printing apparatus which prints an image based on print job data on a recording medium,
   wherein said printing apparatus comprises:
   instruction means for issuing a print cancel instruction;
   notification means for, in response to the print cancel instruction by said instruction means, stopping a current printing process and notifying said host computer of print cancellation; and
   processing means for, after issuance of the print cancel instruction by said instruction means, deleting print data received until predetermined data indicating end of print job will be received from said host computer, and
   wherein said host computer comprises:
   means for, in response to a notification of print cancellation by said notification means, stopping generation of print data, and outputting the predetermined data indicating end of the print job.

8. The printing system according to claim 7, wherein communication with said host computer is made by packet communication, and wherein said notification means notifies said host computer of print cancellation, to cause said host computer to output dummy data for adjustment of packet data length and to output a packet including predetermined data in response to the print cancel instruction by said instruction means.

9. The printing system according to claim 7, wherein said printing apparatus further comprises means for printing information regarding the print cancellation on a recording medium on which an image is printed based on the print data.

10. The printing system according to claim 7, wherein after the issuance of the print cancel instruction by said instruction means, said processing means causes paper discharge.

11. The printing system according to claim 7, wherein said host computer transmits the print data before a break of command and then outputs the predetermined data to said printing apparatus, in response to the issuance of the print cancel instruction by said instruction means.

12. A printing cancellation method for a printing apparatus which receives print job data from a host computer and prints, on a recording medium, an image on the basis of the received print job data, the host computer, upon receipt of a notification of print cancellation from the printing apparatus during generating and outputting of the print job data to the printing apparatus, stopping generation of the print data and outputting predetermined data indicating end of the print job to the printing apparatus, comprising:
   a determination step of determining whether or not a print cancel instruction has been inputted during printing based on print data;
   a notification step of, if determined at said determination step that the print cancel instruction has been inputted, stopping a current printing process and notifying the host computer of print cancellation, to cause the host computer to stop generation of the print data and to output the predetermined data indicating end of the print job; and
   a processing step of, after input of the print cancel instruction, deleting the print data received until the predetermined data will be received from the host computer.

13. The printing cancellation method according to claim 12, wherein communication with the host computer is made by packet communication, and wherein at said notification step, the host computer is notified of print cancellation, and thereby caused to output dummy data for adjustment of packet data length and to output a packet including the predetermined data, in response to the print cancel instruction at said instruction step.

14. The printing cancellation method according to claim 12, further comprising the step of printing information regarding the print cancellation on a recording medium on which an image is printed based on the print data.

15. The printing cancellation method according to claim 12, wherein at said processing step, after the input of the print cancel instruction at said instruction step, paper discharge is caused.

16. The printing cancellation method according to claim 12, wherein the host computer transmits the print data before a break of command and then outputs the predetermined data to the printing apparatus, in response to the input of the print cancel instruction.

17. The printing cancellation method according to claim 12, wherein said processing step skips the print data received until the predetermined data is received from the host computer.

18. A computer-readable storage medium embodying a program of a printing cancellation method for a printing apparatus which receives print job data from a host computer and prints, on a recording medium, an image on the basis of the received print job data, the host computer, upon receipt of a notification of print cancellation from the printing apparatus during generating and outputting of the print job data to the printing apparatus, stopping generation of the print data and outputting predetermined data indicating end of the print job to the printing apparatus, comprising:
a determination step of determining whether or not a print cancel instruction has been inputted during printing based on print data;
a notification step of, if determined at said determination step that the print cancel instruction has been inputted, stopping a current printing process and notifying the host computer of print cancellation, to cause the host computer to stop generation of the print data and to output the predetermined data indicating end of the print job; and
a processing step of, after input of the print cancel instruction, deleting the print data received until the predetermined data will be received from the host computer.

19. The storage medium according to claim 18, wherein communication with the host computer is made by packet communication, and wherein at said notification step, the host computer is notified of print cancellation, and thereby caused to output dummy data for adjustment of packet data length and to output a packet including predetermined data, in response to the print cancel instruction at said instruction step.

20. The storage medium according to claim 18, wherein said program further comprises the step of printing information regarding the print cancellation on a recording medium on which an image is printed based on the print data.

21. The storage medium according to claim 18, wherein after the input of the print cancel instruction, at said processing step, paper discharge is caused.

22. The storage medium according to claim 18, wherein the host computer transmits the print data before a break of command and then outputs the predetermined data to the printing apparatus, in response to the input of the print cancel instruction.

23. An information processing apparatus which generates print job data and outputs the print job data to a printing apparatus, comprising:
determination means for, while generating and sending print job data to the printing apparatus, determining whether or not a notification of print cancellation has been received from the printing apparatus; and
transfer means for, if said determination means determines that the notification of print cancellation has been received, stopping generation of the print job data, and transferring predetermined data indicating, end of print job to the printing apparatus,
wherein the printing apparatus deletes print job data until the predetermined data will be received from said information processing apparatus.

24. The information processing apparatus according to claim 23, wherein if said determination means determines that the notification of print cancellation has been received, said transfer means transmits the print data before the break of command, and then outputs the predetermined data to the printing apparatus.

25. An information processing method which generates print job data and outputs the print job data to a printing apparatus, comprising:
a determination step of, while generating and sending print job data to the printing apparatus, determining whether or not a notification of print cancellation has been received from the printing apparatus; and
a transfer step of, if determined at said determination step that the notification of print cancellation has been received, stopping generation of the print job data, and transferring predetermined data indicating end of print job, to the printing apparatus,
wherein the printing apparatus deletes print job data until the predetermined data will be received.

26. The information processing method according to claim 25, wherein if determined at said determination step that the notification of print cancellation has been received, the print data before the break of command is transmitted and then the predetermined data is outputted to the printing apparatus at said transfer step.

27. A computer-readable storage medium embodying a printing processing program which generates print job data and outputs to a printing apparatus, comprising:
a determination step of, while generating and sending print job data to the printing apparatus, determining whether or not a notification of print cancellation has been received from the printing apparatus; and
a transfer step of, if determined at said determination step that the notification of print cancellation has been received, stopping generation of the print job data, and transferring predetermined data indicating end of print job, to the printing apparatus,
wherein the printing apparatus deletes print job data until the predetermined data will be received.

28. The storage medium holding the printing processing program according to claim 27, wherein if determined at said determination step that the notification of print cancellation has been received, the print data before the break of command is transmitted and then the predetermined data is outputted to the printing apparatus at said transfer step.

* * * * *

UNITED STATES PATENT AND TRADEMARK OFFICE
CERTIFICATE OF CORRECTION

PATENT NO. : 7,158,243 B2  
APPLICATION NO. : 09/903588  
DATED : January 2, 2007  
INVENTOR(S) : Sakamoto et al.

Page 1 of 1

It is certified that error appears in the above-identified patent and that said Letters Patent is hereby corrected as shown below:

COLUMN 4:  
Line 1, "reduces" should read --reducing--.

COLUMN 7:  
Line 8, "is" should read --are--.  
Line 48, "an" should be deleted.  
Line 64, "is" (second occurrence) should read --be--.  
Line 65, "is" should read --be--.

COLUMN 8:  
Line 45, "a" should read --an--.

COLUMN 9:  
Line 65, "the" (third occurrence) should read --of the--.

COLUMN 10:  
Line 2, "temporarily-stored" should read --temporarily stored--.  
Line 21, "proceeds" should read --the process proceeds--.

Signed and Sealed this

Twenty-sixth Day of August, 2008

JON W. DUDAS  
*Director of the United States Patent and Trademark Office*